US009251659B2

(12) United States Patent
Guinn et al.

(10) Patent No.: US 9,251,659 B2
(45) Date of Patent: Feb. 2, 2016

(54) INTEGRATING OTHER PLAYERS WINS INTO A WAGERING GAME

(71) Applicant: WMS Gaming, Inc., Waukegan, IL (US)

(72) Inventors: Andrew C. Guinn, Chicago, IL (US); Joel R. Jaffe, Glenview, IL (US); Richard B. Robbins, Glenview, IL (US)

(73) Assignee: WMS Gaming, Inc., Waukegan, IL (US)

( * ) Notice: Subject to any disclaimer, the term of this patent is extended or adjusted under 35 U.S.C. 154(b) by 0 days.

(21) Appl. No.: 13/789,133

(22) Filed: Mar. 7, 2013

(65) Prior Publication Data

US 2014/0018158 A1 Jan. 16, 2014

Related U.S. Application Data

(60) Provisional application No. 61/670,447, filed on Jul. 11, 2012.

(51) Int. Cl.

*A63F 13/00* (2014.01)
*G07F 17/32* (2006.01)
*G07F 17/34* (2006.01)

(52) U.S. Cl.

CPC ............ *G07F 17/3267* (2013.01); *G07F 17/34* (2013.01)

(58) Field of Classification Search

CPC ... G07F 17/32; G07F 17/323; G07F 17/3244; G07F 17/3281
USPC ...................................................... 463/20, 25
See application file for complete search history.

(56) References Cited

U.S. PATENT DOCUMENTS

| | | | |
|---|---|---|---|
| 5,197,736 | A | 3/1993 | Backus et al. |
| 5,632,485 | A | 5/1997 | Woodland et al. |
| 5,720,662 | A | 2/1998 | Holmes, Jr. et al. |
| 5,848,936 | A | 12/1998 | Morrison |
| 5,851,148 | A | 12/1998 | Brune et al. |
| 5,857,909 | A | 1/1999 | Rubin |
| 6,001,016 | A | 12/1999 | Walker et al. |
| 6,012,983 | A | 1/2000 | Walker et al. |
| 6,068,552 | A | 5/2000 | Walker et al. |
| 6,120,031 | A | 9/2000 | Adams |
| 6,190,255 | B1 | 2/2001 | Thomas et al. |
| 6,311,976 | B1 | 11/2001 | Yoseloff et al. |
| 6,361,437 | B1 | 3/2002 | Walker et al. |
| 6,364,313 | B1 | 4/2002 | Moody |
| 6,416,406 | B1 | 7/2002 | Duhamel |

(Continued)

FOREIGN PATENT DOCUMENTS

| | | |
|---|---|---|
| WO | WO-9719736 | 6/1997 |
| WO | WO-2009005657 | 1/2009 |

(Continued)

OTHER PUBLICATIONS

U.S. Appl. No. 13/600,837, filed Aug. 31, 2012, Barclay, Brian J., et al.

(Continued)

*Primary Examiner* — Allen Chan
(74) *Attorney, Agent, or Firm* — DeLizio Law, PLLC

(57) ABSTRACT

Systems and methods provide a wagering game in which previous wins from other games of other players or the current player are integrated into the wagering game and provided as a potential payout in the wagering game.

27 Claims, 10 Drawing Sheets

(56) References Cited

U.S. PATENT DOCUMENTS

| | | | | |
|---|---|---|---|---|
| 6,746,328 | B2 | 6/2004 | Cannon et al. | |
| 6,913,262 | B2 | 7/2005 | Berman | |
| 7,322,887 | B2 | 1/2008 | Belger et al. | |
| 7,618,319 | B2 | 11/2009 | Casey et al. | |
| 7,740,245 | B2 | 6/2010 | Tarantino | |
| 7,744,453 | B2 | 6/2010 | Pacey | |
| 7,993,195 | B2 | 8/2011 | Belger et al. | |
| 8,172,687 | B2 | 5/2012 | Gagner et al. | |
| 2002/0151349 | A1 | 10/2002 | Joshi | |
| 2003/0100361 | A1 | 5/2003 | Sharpless et al. | |
| 2003/0224847 | A1 | 12/2003 | Jaimet | |
| 2005/0055113 | A1 | 3/2005 | Gauselmann | |
| 2006/0084486 | A1 | 4/2006 | Belger et al. | |
| 2006/0247039 | A1 | 11/2006 | Lerner et al. | |
| 2007/0208751 | A1 | 9/2007 | Cowan et al. | |
| 2008/0113761 | A1* | 5/2008 | Belger et al. | 463/20 |
| 2008/0220848 | A1 | 9/2008 | Adiraju et al. | |
| 2009/0117990 | A1 | 5/2009 | Englman et al. | |
| 2009/0131160 | A1* | 5/2009 | Torres | 463/27 |
| 2009/0264190 | A1 | 10/2009 | Davis et al. | |
| 2010/0016063 | A1 | 1/2010 | Jaffe et al. | |
| 2010/0056251 | A1 | 3/2010 | Jaffe et al. | |
| 2010/0222130 | A1* | 9/2010 | Pacey | 463/20 |
| 2010/0304843 | A1 | 12/2010 | Aoki et al. | |
| 2011/0021266 | A1 | 1/2011 | Jaffe et al. | |
| 2011/0045892 | A1 | 2/2011 | Vann et al. | |
| 2011/0201403 | A1* | 8/2011 | Jaffe et al. | 463/20 |
| 2011/0244949 | A1 | 10/2011 | Gagner et al. | |
| 2013/0210518 | A1 | 8/2013 | Barclay et al. | |

FOREIGN PATENT DOCUMENTS

| | | |
|---|---|---|
| WO | WO-2009042563 | 4/2009 |
| WO | WO-2009114472 | 9/2009 |

OTHER PUBLICATIONS

"PCT Application No. PCT/US2009/036535 International Search Report", Apr. 17, 2009 , 3 pages.

"U.S. Appl. No. 13/600,837 Office Action", Jan. 17, 2014 , 20 Pages.

* cited by examiner

INTEGRATING OTHER PLAYERS WINS INTO A WAGERING GAME

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2013, WMS Gaming, Inc.

FIELD

Embodiments of the inventive subject matter relate generally to wagering game systems, and more particularly to wagering game systems that integrate previous wins into wagering games.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into five sections. The first section provides an introduction to embodiments of the invention, while the second section describes example wagering game machine architectures. The third section describes example operations performed by some embodiments and the fourth section describes example wagering game machines in more detail. The fifth section presents some general comments.

Introduction

This section provides an introduction to some embodiments of the invention. In general, the embodiments provide a wagering game in which previous wins from other games of other players or the current player are integrated into the wagering game and provided as a potential payout in the wagering game.

Figure 1:
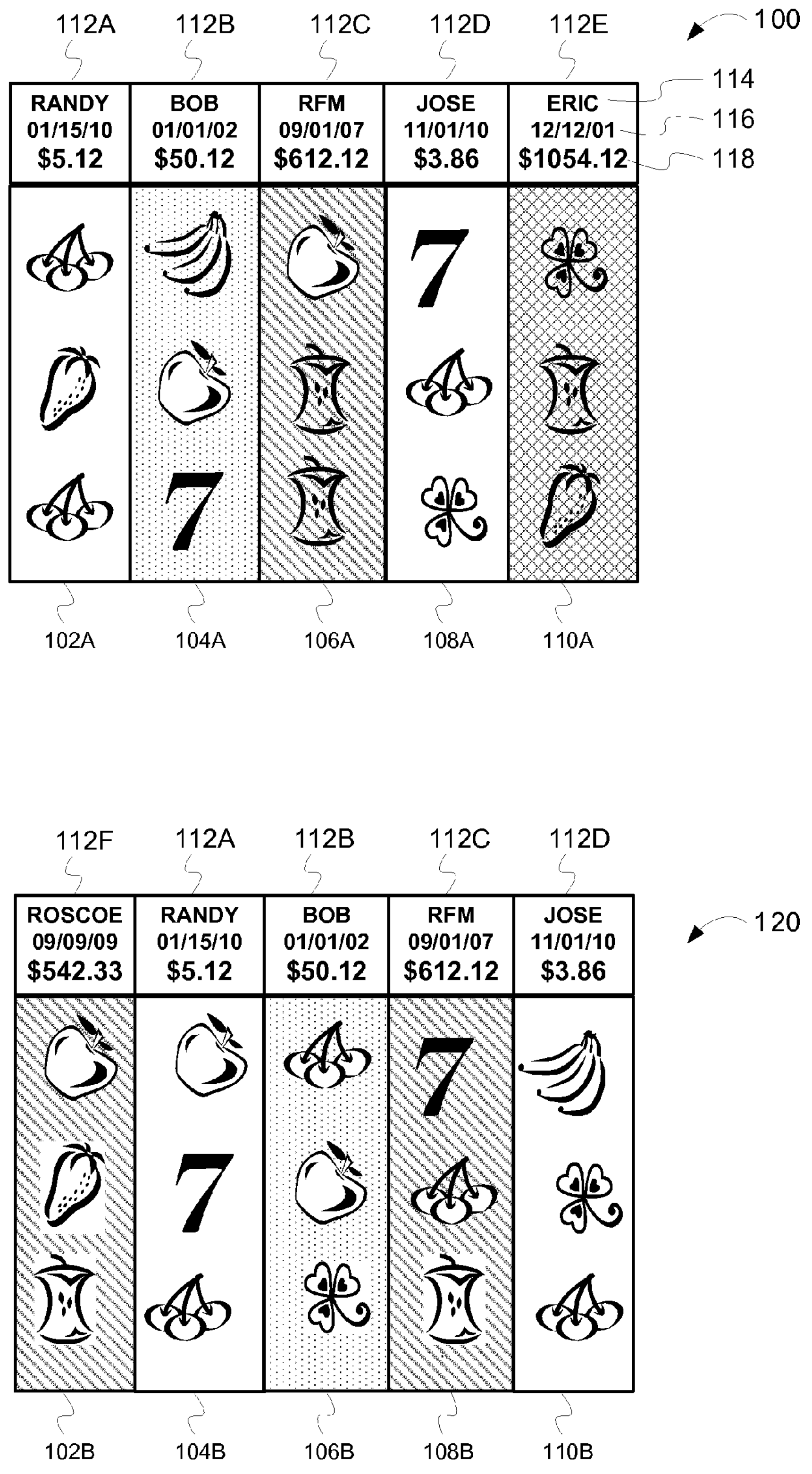
FIG. 1 is an example screen image of a slots based game having previous win amounts associated with reels.

FIG. 1 illustrates example screen images 100 and 120 for a wagering game incorporating previous win amounts from other games. In the example illustrated in FIG. 1, the wagering game is a slots game having five reels 102-110. Those of skill in the art having the benefit of the disclosure will appreciate that other numbers of reels and reel symbols may be used. Above each reel is a display element (elements 112A-112E) showing a previous win amount 114 from a previous round of a wagering game. The previous win amounts may be from the same wagering game, from different wagering games in the same gaming establishment, from different wagering games in different gaming establishments, or from online games. In some embodiments, the previous win amounts are previous win amounts from games played by players other than the current player of a wagering game. In alternative embodiments, the previous win amounts may also include the current player's previous win amounts awarded on other wagering game machines. In some embodiments, the display elements for previous wins may include a win amount 118, an identifier 114 (e.g., "Randy", "Bob", "RFM", "Jose" and "Eric") for the player having the win, and the date 116 of the previous win. While display elements 112A-112E are illustrated in the example of FIG. 1 as being on top of their associated reels, it will be appreciated that the display elements could alternatively be placed at the bottom, sides or within their associated reels.

During wagering game play, a previous win amount may be randomly selected and awarded to the player. In some embodiments, the appearance of a special symbol in a reel of the wagering game indicates that a player has won the previous win amount associated with that reel. In alternative embodiments, the reel may be highlighted to indicate that the player has won the previous win amount associated with the reel. For example, the reel may be made to blink, a border around the reel may be highlighted, or other method of highlighting the reel may be used in various embodiments to indicate that the previous win amount associated with the reel was won.

The probability that a player is awarded one of the previous win amounts may be determined in various ways. In some embodiments, the magnitude of the previous win amount is used to determine a probability of a player winning the previous win amount. Thus the probability of winning a relatively large previous win amount is less than the probability associated with winning a relatively small previous win amount. The probability of winning a previous win amount may be assigned according to groups of win amounts. For example, win amounts greater than $1000 may be assigned a first probability, win amounts between $500 and $1000 may be assigned a second probability, win amounts between $50 and $500 maybe assigned a third probability, and win amounts less than $50 may be assigned a fourth probability. Those of skill in the art having the benefit of the disclosure will appreciate that various groupings according to win amounts may be used and are within the scope of the inventive subject matter. Thus in the example illustrated in FIG. 1, the probability associated with winning the $1054.12 amount in display element 112E may be less than the probability of winning the $5.12 amount in display element 112A.

In alternative embodiments, the previous win amounts may be aggregated and the probability of any particular amount may be the same for a particular group of win amounts. In further alternative embodiments, the probability of receiving a previous win amount may be configured to be the same regardless of the previous win amounts.

In embodiments where the probability of receiving a previous win amount varies depending on the magnitude of the previous win amount, the reels may have colored backgrounds (indicated by crosshatching the reel in FIG. 1) or other highlighting to indicate the probability associated with the reel. For example, reels 102A and 108A have relatively low previous win amounts associated with the reels and therefore may have a green background color in some embodiments indicating a relatively higher probability of winning the previous win amount. Reel 104A has a medium low previous win amount and may have a yellow background to indicate the associated probability of winning the previous win amount. Reel 106A has a as a medium high previous win amount and may have an orange background to indicate the associated probability of winning the previous win amount. Reel 119A has a high previous win amount and thus may have a red background to indicate the associated probability of winning the previous win amount. Those of skill in the art having the benefit of the disclosure will appreciate that other color schemes or indication mechanisms may be used to associate probability with a previous win amount for a reel.

The previous win amounts associated with a reel may periodically change. The period may be a time period or a play (e.g., a spin) of the reels. In some embodiments, the previous win amounts associated with a reel shift one position upon each reel spin. Screen image 120 illustrates a change in the example reel configuration after a spin of the reels having an initial configuration illustrated by screen image 100 described above. Reels 102B-110B in screen image 120 represent the new positions of reels 102A-110A of screen image 100. In the updated reel configuration, the previous win amounts have shifted one position to the right. In the example shown, display element 112E having a previous win amount of $1054.12 has been removed from the display while display elements 112A-112D have each shifted one reel to the right. Display element 112F having a previous win amount of 542.33 has been added on left-most reel 102B. Those of skill in the art having the benefit of the disclosure will appreciate that other shift amounts or directions are possible and within the scope of the inventive subject matter.

In alternative embodiments, the display elements having previous win amounts may be replaced with new display elements having new previous win amounts after various periods (e.g., every reel spin, every five reel spins, every twenty seconds, every minute etc.). Further, replacement of previous win amounts may be staggered such that the previous win amounts associated with a reel change at different times from other reels.

Figure 2:
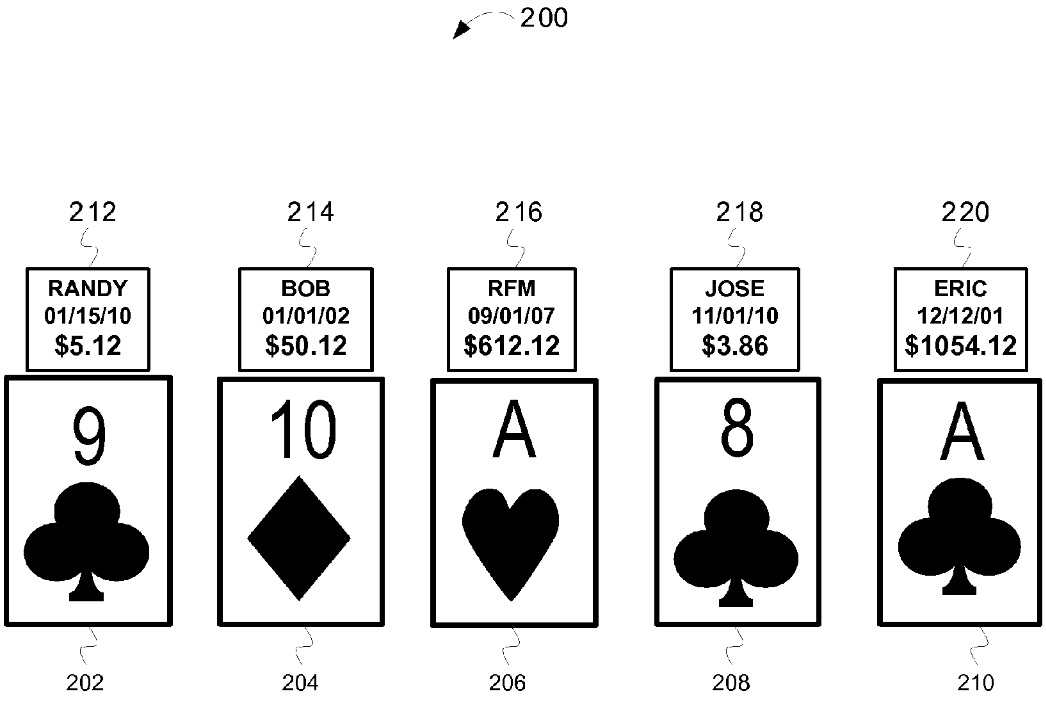
FIG. 2 is an example screen image of a card based game having previous win amounts associated with the cards.

FIG. 2 illustrates a screen image 200 for a card game having previous win amounts 212-220 associated with cards 202-210. In some embodiments, previous win amounts may be associated with each card in a hand. The previous win amounts may be changed periodically, for example after the expiration of a time period or upon a new deal of cards.

Although FIGS. 1 and 2 describe some embodiments, the following sections describe many other features and embodiments.

Operating Environment

This section describes an example operating environment and presents structural aspects of some embodiments.

Figure 3:
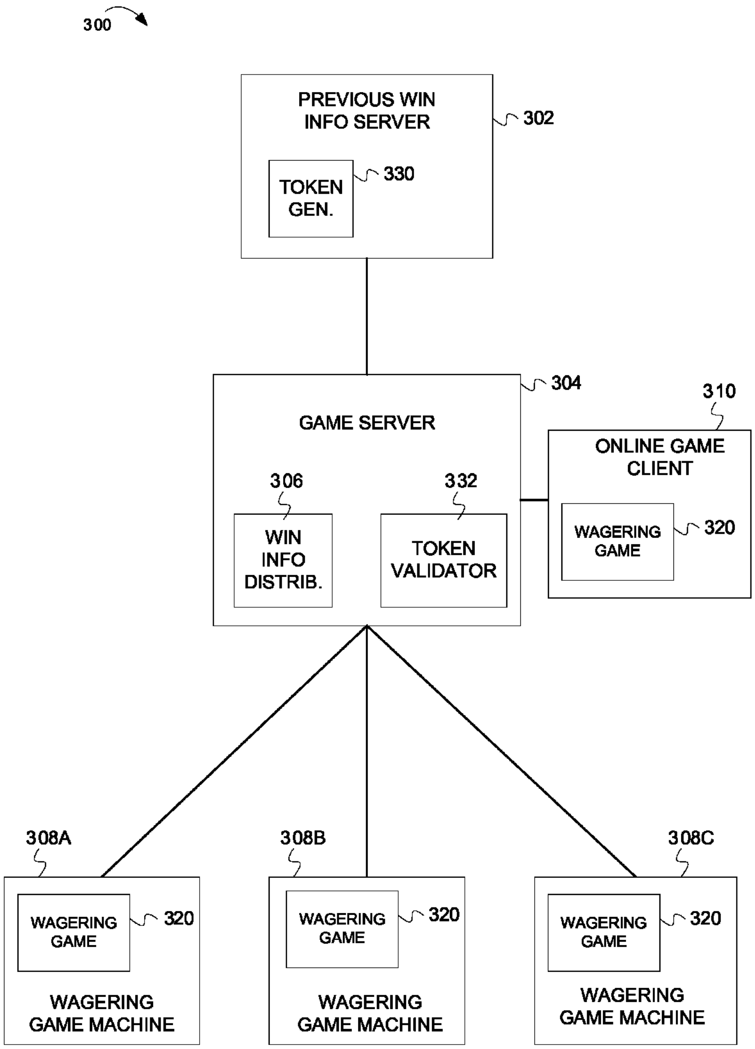
FIG. 3 is a block diagram of a system for integrating previous wins into a wagering game according to embodiments.

FIG. 3 is a block diagram of a system 300 according to embodiments of the inventive subject matter. System 300, in some embodiments, includes a previous win information server 302, game server 304 and one or more wagering game machines 308. System 300 may optionally include online game clients 310.

Previous win information server 302 can be any server or service that provides information related to previous wins occurring on wagering games within a gaming establishment or group of gaming establishments. In some embodiments, wagering game machines or game servers may send win information to previous win information server 302. Additionally, online wagering games may send information regarding win amounts for online wagering games to previous win information server 302. As an example, the "WinStream" feature provided by WMS Gaming Inc. is a news feed that provides updates on winning activities of registered users on wagering game machines and online games. Previous win information server 302 receives the previous win information from various sources and stores the information and may further distribute the previous win information to game servers or wagering game machines so that the win information may be incorporated into various types of wagering games.

Game server 304 provides one or more games or game elements that may be used to present wagering games or online games on either or both of wagering game machines 308 and online game client 310. In some embodiments, game server 304 obtains previous win information from previous win information server 302 and incorporates the previous win information into various types of wagering games as described above and as further described below. The domain of data obtained may vary in different embodiments. For example in some embodiments, data from a particular gaming establishment is used. In alternative embodiments, data for wins occurring in a particular geographic region or within a radius of a particular point may be obtained. In further alternative embodiments, data provided to a particular wagering game machine may be filtered to include only wins within a particular distance of the wagering game machine player's home. The domain may be filtered to include only players that are in a social network of the player.

The domain of data may also be filtered based on time. For example, previous wins may be stored and only those wins occurring more than a particular number of days prior to the current play of the game may be included.

Further, the domain of data may be filtered based on the amount of the previous win. For example, in some embodiments, only wins above a threshold amount are included. The threshold may vary based on time, date, number of people playing or other criteria. Thus a threshold may be set low when the number of players is low and set higher when the number of players increases. Varying the threshold amount helps insure that a sufficient number of previous wins are available when few player are playing and helps keep players interested with larger previous win amounts when large numbers of people are playing.

The various parameters described above may be defined or used as part of a rule set that determines the domain of data. A gaming establishment may change the rule set as desired to meet particular goals for the casino (player enjoyment, revenue maximization, promotional purposes etc.)

Wagering game machine 308 can be an electromechanical wagering game machine configured to play wagering games. A wagering game presented on wagering game machine 308 can be a mechanical slots game. Alternatively, a wagering game can be an electronic wagering game including video casino games, such as blackjack, slots, keno, poker, blackjack, roulette, etc. Further details on wagering game machine 308 are provide below.

Online game client 310 communicates with game server 304 to present wagering games 320 on online game client 310. Online game client 310 may be any type of computing device, including personal computers, laptop computers, tablet computers, personal digital assistants, mobile phones etc. The embodiments are not limited to any particular computing device.

During operation, game server 304 obtains previous win information from previous win information server 302. A win information distributor 306 on game server 304 distributes the previous win information to wagering games 308 or online client 320 for incorporation into wagering games 320. Win information distributor 306 may apply various algorithms to determine how to distribute previous win information. In some embodiments, the same previous win information may be sent to all wagering game machines. In alternative embodiments, previous win information may be sent on a first in first out basis to wagering game machines such that such that each wagering game machine receives different previous win amounts for incorporation into their respective wagering games 320. In further alternative embodiments, win information distributor 306 may select win amounts to distribute in order to achieve a particular expected value for wagering games 320 on wagering game machines 308.

The previous win information may be received from a variety of sources, and the sources may be from third parties relative to the game server. Thus it may be desirable to validate previous win information prior to distributing the previous win information to wagering game machines 308 or online wagering games 320. In some embodiments, previous win information server 302 includes a token generator 330 that generates tokens that are used to validate the previous win information. A token is associated with a previous win amount. The token may be optionally encrypted prior to sending the token to game server 304. Game server 304 receives the previous win amount along with the associated token. A token validator 332 decrypts the token and used the token to validate the previous win amount. If the previous win amount is determined to be valid, it may then be distributed as determined by win information distributor 306.

Although shown as separate entities in FIG. 3, the functionality provided by previous win information server 302, game server 304, wagering game machine 308 or online game client may be combined or distributed differently than shown in FIG. 3. Additionally, the functionality may be provided within different entities than that shown in FIG. 3. As an example, depending on the system design, a wagering game machine 308 may or may not need to use game server 304 and may receive previous win information directly from previous win information server 302 and use the information to integrate previous win amounts into wagering games presented on the wagering game machine.

Figure 4:
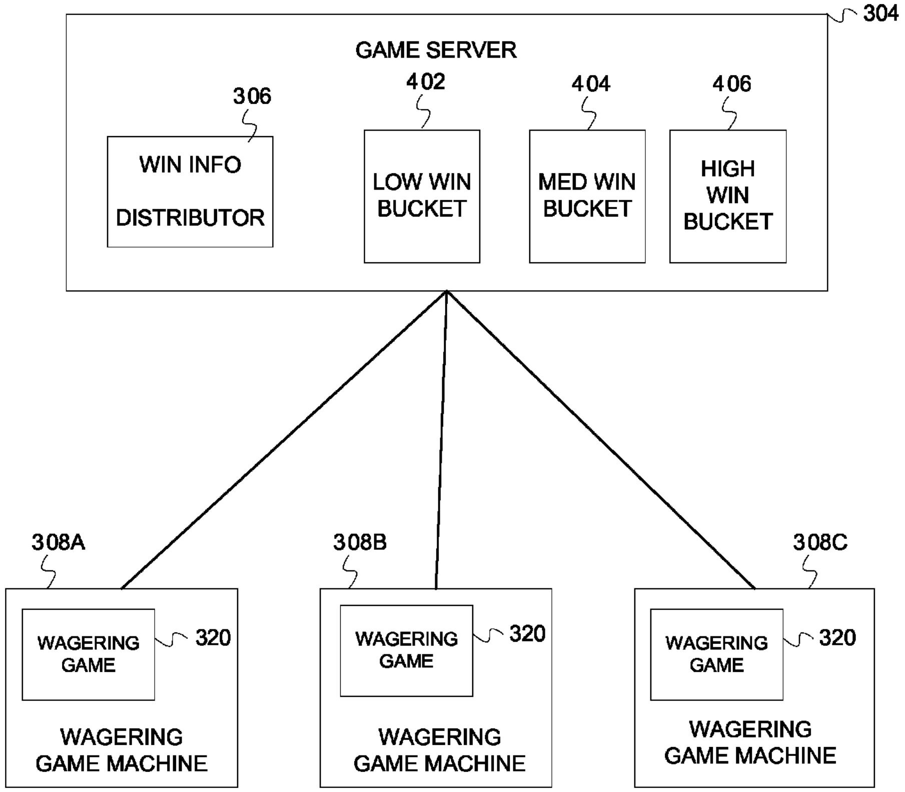
FIG. 4 provides further details on a win information distributor according to embodiments.

FIG. 4 provides further details on a win information distributor 306 according to embodiments. In some embodiments, game server 304 maintains various previous win information buckets 402-406. A win information bucket is a data structure such as an array or list that maintains information about previous wins received from a previous win information server. In the example illustrated in FIG. 4, three buckets are maintained, a low win bucket 402, a medium win bucket 404 and a high win bucket 406. Low bucket 402 may hold information regarding previous wins that are determined to be low, for example, wins below $50.00. Medium bucket 404 may hold information regarding previous wins that are determined by to be a medium amount, for example, wins between $50.01 and $500.00. High bucket 406 may hold information for previous wins determined to be high, for example, win amounts greater than $500.00. Those of skill in the art having the benefit of the disclosure will appreciate that other numbers of buckets and other previous win amount classifications may be used and are within the scope of the inventive subject matter.

Win information distributor 306 may use the buckets 402-406 to aid in achieving a desired distribution of previous win amounts to wagering game machines. For example, win information distributor 306 may use an algorithm that selects particular numbers of previous win amounts from each bucket to achieve a desired distribution or expected value. As an example, for every ten distributions, the win distributor may select seven previous wins from low bucket 402, two previous wins from medium bucket 404, and one previous win from high bucket 406.

Example Operations

This section describes operations associated with some embodiments of the invention. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 5:
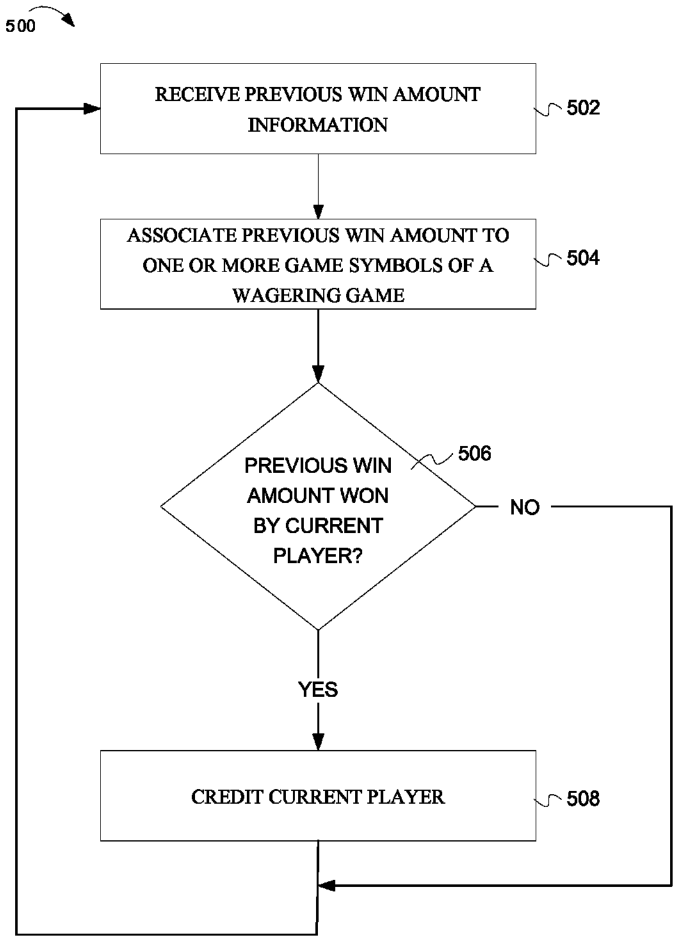
FIG. 5 is a flowchart illustrating a method for incorporating previous win amounts into a wagering game.
Figure 6:
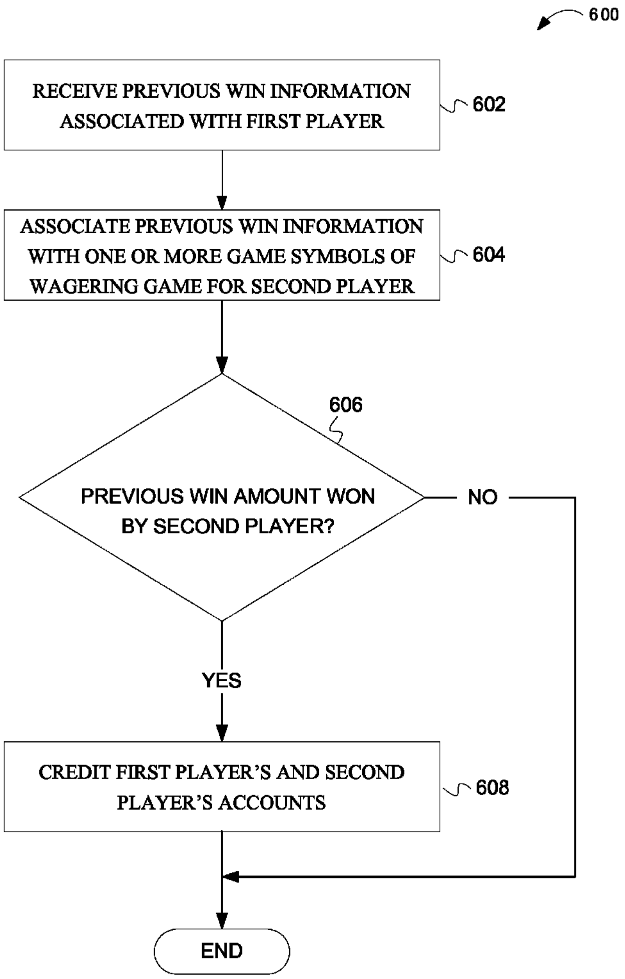
FIG. 6 is a flowchart illustrating a method for presenting a game that incorporates previous wins, where a person associated with the previous win participates in the game.

The section will discuss FIGS. 5-6. The discussion of FIGS. 5-6 will describe operations for including previous win amounts into wagering games and for awarding players whose previous wins are used to award another player.

FIG. 5 is a flowchart illustrating a method 500 for incorporating previous win amounts into a wagering game. The method begins at block 502 by a wagering game receiving previous win information for incorporation into the wagering game. For example, the wagering game may receive previous win information as part of a WinStream feed. The wagering game may receive the previous win information from a game server or directly from a previous win information server. The previous win information may include previous wins of the player or other players both within a game establishment or within a group of gaming establishments. The previous win information may be previous wins that have just occurred, i.e., in real time or near real time. Alternatively, the previous wins may be wins that occurred over a predetermined of configured time period.

At block 504, the previous win amount is associated with one or more wagering game symbols. In some embodiments, the previous win amount is associated with a reel of a slots based wagering game. In alternative embodiments, the previous win amount is associated with a playing card. In further alternative embodiments, the previous win amount may be associated with a roulette space, a bingo space or bingo ball, a keno space, or other wagering game symbol.

Association of previous win amounts with game symbols or elements may be accomplished in various ways. In some embodiments, previous win amounts are associated with game symbols or elements in the order that the previous win amounts are received (either by a server or by the wagering game machine). In alternative embodiments, previous win amounts may be associated with game symbols or elements using algorithms designed to achieve a particular expected value. Thus previous win amounts may be selected for association with game symbols based on their contribution to the expected value. In further alternative embodiments, previous win amounts may be selected for association with game symbols based on whether or not the previous win amount was won at the same type of game as the currently played wagering game. For example, previously won poker amounts may be used on poker games, while previously won slot machine amounts may be used on slot games. Further, the previous win amounts may be associated based on matching themes of the previous game and the current game. In addition, previous won amounts may be selected according to a threshold. For example, only wins that exceed a predetermined or configured amount may be selected for inclusion.

At block 506, the system determines if the player has won any of the previous win amounts associated with the one or more game symbols. In some embodiments, the determination is made based on the output of a random number generator. If the output indicates that the player has won a previous win amount, then at block 508, the previous win amount is credited to the player. The wagering game may indicate the win by causing a special symbol to appear among the wagering game symbols associated with the previous win amount. For example, a special reel symbol occurring in the reel may indicate that the player has won the previous win amount associated with the reel. In alternative embodiments, one symbol may be used to indicate a win of one previous win amount associated with a game symbol while a second symbol may be used to indicate that a player has won all of the previous win amounts. For example, a first symbol appearing on a reel may indicate that a player has won the previous win amount associated with the reel, while a second symbol, if it appears, indicates that the player has won the previous win amounts associated with each of the reels of the game. Other methods may be used to indicate that a player has won a previous win amount associated with a reel or other game symbols. For example, the border of the reel may be highlighted in a different color or made to blink.

In some embodiments, a matching algorithm is used to determine if a player has won a previous win amount. In such embodiments, the current player wins the previous win amount if a winning outcome of the currently played game matches a previous win amount of a previously played game. The level of matching may vary. In some embodiments, outcome must match based on the game symbols matching (e.g., the reel positions or card hand must match), while in other embodiments, a match of the amount is all that is required (e.g., a card hand that won $5.00 matches a slot result of $5.00).

Otherwise, if the player has not won a previous win amount, then in some embodiments, the method returns to block 504 to associate a new set of previous win amounts with a set of one or more game symbols for the wagering game. As indicated above, in some embodiments, one or more of the previous win amounts are reused. For example, the previous win amounts from a previous round of a slots game may be shifted one or more reels, with the oldest previous win amount removed and a new previous win amount associated with one or more game symbols. In alternative embodiments, a completely new set of previous win amounts may be associated with the wagering game symbols. In further alternative embodiments, previous win amounts may remain for a predetermined or configurable amount of time.

FIG. 6 is a flowchart illustrating a method 600 for presenting a game that incorporates previous wins, where a person associated with the previous win participates in the game. Like method 500, method 600 begins at block 602 by receiving previous win information for incorporation into the wagering game. In some embodiments, each of the previous win information items is associated with particular players (e.g., using a player identifier), including a first player. For example, the first player may be a player who has registered an account with WinStream and where an information stream about the first player has been automatically generated (e.g., the first player had a win either online or at a wagering game machine while logged into their account).

At block 604, the system associates a win information amount received at block 602 with one or more wagering game symbols (e.g., a reel, a card, a bingo ball etc.) in a wagering game being played by a second player.

At block 606, the system determines if the previous win amount is won by the second player. As noted above, the output of a random number generator may be used to make the determination. If the second player has won the previous win amount, then at block 608, the system credits the second player with the previous win amount. In addition, the first player who originally won the previous win amount is also provided an award. The award may comprise some or all of the previous win amount. For example, the first player may be awarded a percentage of the previous win amount. In alternative embodiments, the first and second player may share the previous win amount.

Numerous variations on the systems and methods described above are possible, and different games may be designed that use previous win amounts.

Figure 7:
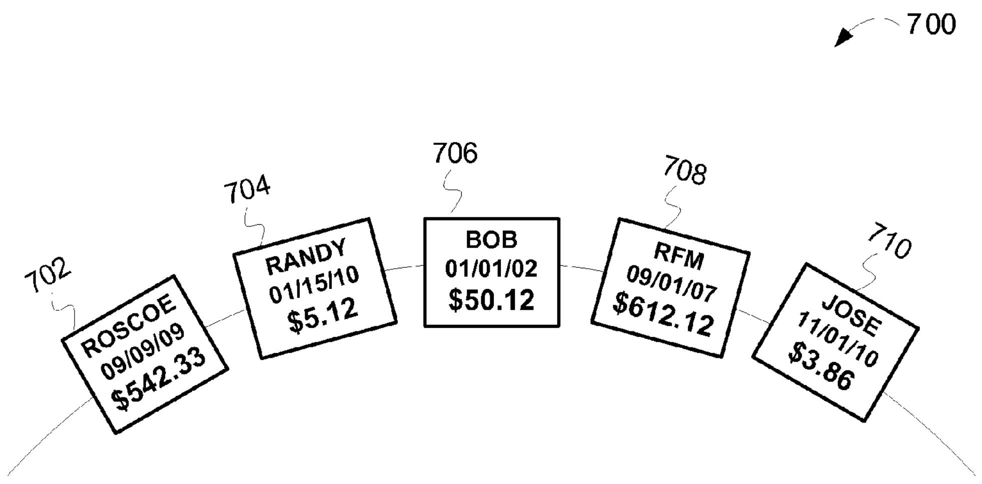
FIG. 7 illustrates a cash wheel game that incorporates previous win amounts.

FIG. 7 illustrates a cash wheel game that incorporates previous win amounts. Cash wheel 700 has multiple positions, where at least some of the positions have previous win amounts associated with the position. In some embodiments, all of the positions may have previous win amounts, while in alternative embodiments, only a subset of the positions (e.g., five out of twenty) have previous win amounts while the other positions retain their ordinarily assigned values. In the example, illustrated in FIG. 7, display elements 702-710 are assigned to positions on cash wheel 700. The wheel is then spun, and one position is indicated as a winning position. The amount at that position is then awarded to the player. In some embodiments, the price of a bet for the cash wheel varies depending on the expected value of a play.

Various other types of games incorporating previous wins are possible. For example, in some embodiments, previous win amounts are used to contribute to a single jackpot, similar to a progressive wagering game. The amount of the jackpot grows as previous wins contribute to the jackpot. The amount used to contribute to the jackpot may be subjected to a threshold requirement. In some embodiments, a user can select the jackpot (e.g., through a touch screen or other user interface), which causes the machine to display the previous wins that contributed to the jackpot.

In some embodiments, in response to the occurrence of a triggering event, the jackpot is shared among all players having previous wins that were used to contribute to the jackpot. The jackpot may be shared equally, or pro-rated based on the player's contribution to the jackpot. Further, in some embodiments, the jackpot may only be won when it exceeds a predetermined or configured threshold. The threshold may increase upon each win of the jackpot.

Another type of game involves placing previous win amounts in a pool, where one of the previous win amounts is randomly selected in response to the occurrence of a triggering event. The triggering event may be the expiration of time, entry of a particular number of previous wins into the pool etc. The selected previous win is then awarded to the player associated with the win. As an example, a previous wins may be assigned to fish in a fishing based game. Upon the occurrence of the triggering event, one of the fish is "caught" and the previous win amount associated with the caught fish awarded to the player. Entry into the pool of previous wins may be determined by playing for a certain amount of time, wagering a particular amount, or random selection.

A further type of game is a matching based game. In some embodiments, a number of previous win amounts are displayed on a wagering game machine. If a player's current win amount matches or is within a predetermined range of one of the previous win amounts, the player may win the previous win amount. Alternatively, a match with the previous win may be used as a trigger for winning a particular award or entry into a bonus game.

Various features may be incorporated in addition to the game play described above. For example, in some embodiments, clicking (e.g., through a touch screen) on a previous win amount will display how that amount was won. For instance, if the previous win amount was a slots game, the reel positions that resulted in the previous win may be displayed to the current user. Similarly, if the previous win was from a card game, the hand of cards that resulted in the previous win may be displayed. The presentation may be a recreation of the previous win, or it may be a replayed video of the actual win.

In some embodiments, players only see previous win amounts after the spin has been completed. For example, the previous win amounts may be grayed out or otherwise obscured until the spin or round of play has been completed. In alternative embodiments, the previous win amounts are displayed prior to game play.

As discussed above, in some embodiments, previous win amounts are distributed as they are received, and once distributed, are not distributed again. In alternative embodiments, a previous win amount may be distributed over and over again until someone wins the previous win amount. Alternatively, a previous win amount may be distributed a predetermined or configured number of times.

In some embodiments, the previous win amounts are filtered such that only jackpot wins are included (e.g., wins above a particular, typically large, threshold amount). The jackpot win amount information is then distributed to participating wagering game machines for use in associating with reels, cards etc. In some embodiments, the occurrence of a new jackpot win causes the current set of wins associated with reels or cards to scroll.

In some embodiments, players may purchase entry into a wagering game that incorporates previous wins. The player may purchase a particular number of rounds or amount of time. Alternatively, the player may be awarded entry into a wagering game that incorporates previous wins upon the occurrence of a special symbol, playing for a predetermined amount of time, or wagering a particular amount.

In embodiments where a first player is provided an award if their previous win is later won by a second player, the first player may purchase the option to have their previous wins distributed for incorporations into other player games. The first player may purchase a certain amount of time, a certain number of distributions, or other period. Alternatively, the first player's previous wins may be incorporated into other player's games in response to the first player achieving a certain level of game play, wagering above a threshold amount, random selection, or other selection mechanism.

The discussion above has been presented in the context of a wagering game. Various types of currency may be used in the previous wins. For example, secondary currencies such as social currency, loyalty points, free spins, bonus money, marketing money, or goods (buffet visit, show tickets) or services (spa visit) may be included in the previous won amount. The types of currency may be different from that of the base game. For example, the previous wins may be social currency while the base wagering game may be monetary values.

The discussion in the sections above has described system components and methods for presenting a wagering game that incorporates previous win amounts. The next section will describe machine and system architectures and operating environments that support the operations described above.

Wagering Game Machine Architectures

Figure 8:
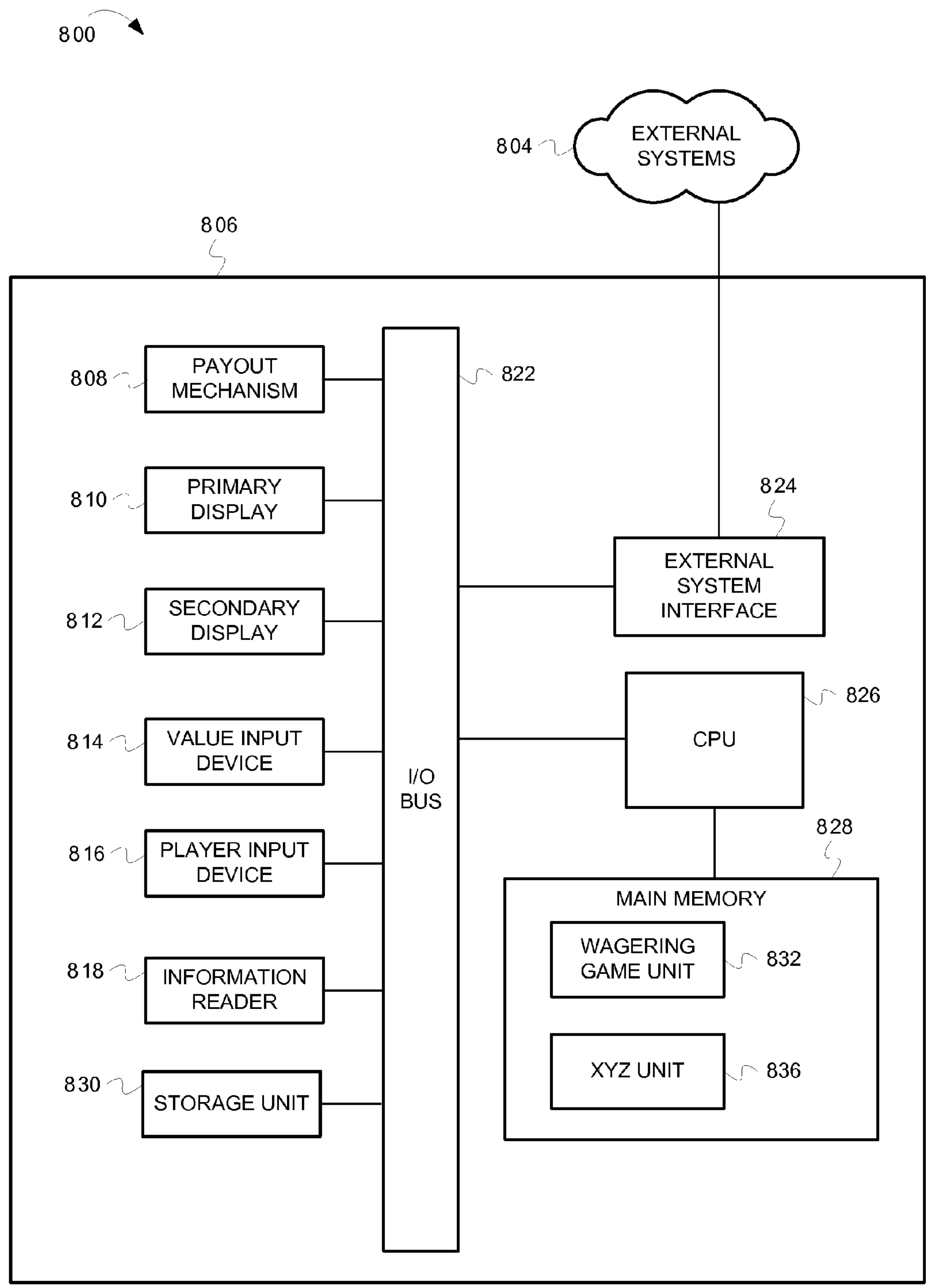
FIG. 8 is a block diagram illustrating a wagering game machine architecture, according to example embodiments of the invention.

FIG. 8 is a block diagram illustrating a wagering game machine architecture, according to example embodiments of the invention. As shown in FIG. 8, the wagering game machine architecture 800 includes a wagering game machine 806, which includes a central processing unit (CPU) 826 connected to main memory 828. The CPU 826 can include any suitable processor, such as an Intel® Pentium processor, Intel® Core 2 Duo processor, AMD Opteron™ processor, or UltraSPARC processor. The main memory 828 includes a wagering game unit 832. In one embodiment, the wagering game unit 832 can present wagering games, such as video poker, video black jack, video slots, video lottery, etc., in whole or part.

The CPU 826 is also connected to an input/output (I/O) bus 822, which can include any suitable bus technologies, such as an AGTL+ frontside bus and a PCI backside bus. The I/O bus 822 is connected to a payout mechanism 808, primary display 810, secondary display 812, value input device 814, player input device 816, information reader 818, and storage unit 830. The player input device 816 can include the value input device 814 to the extent the player input device 816 is used to place wagers. The I/O bus 822 is also connected to an external system interface 824, which is connected to external systems 804 (e.g., wagering game networks).

In one embodiment, the wagering game machine 806 can include additional peripheral devices and/or more than one of each component shown in FIG. 8. For example, in one embodiment, the wagering game machine 806 can include multiple external system interfaces 824 and/or multiple CPUs 826. In one embodiment, any of the components can be integrated or subdivided.

Any component of the architecture 800 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 8 describes an example wagering game machine architecture, this section continues with a discussion wagering game networks.

Wagering Game Networks

Figure 9:
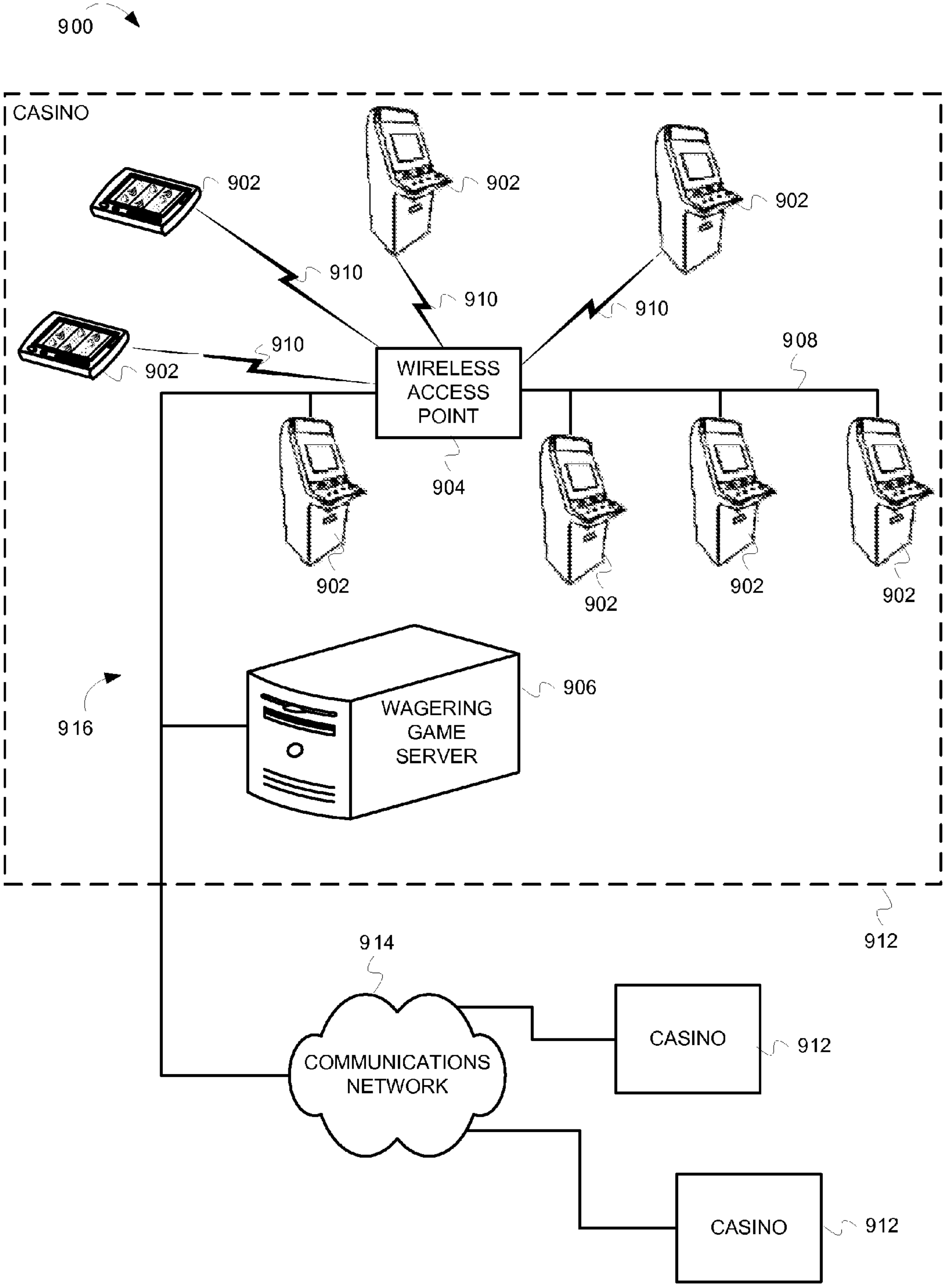
FIG. 9 is a block diagram illustrating a wagering game network, according to example embodiments of the invention.

FIG. 9 is a block diagram illustrating a wagering game network 900, according to example embodiments of the invention. As shown in FIG. 9, the wagering game network 900 includes a plurality of casinos 912 connected to a communications network 914.

Each casino 912 includes a local area network 916, which includes an access point 904, a wagering game server 906, and wagering game machines 902. The access point 9304 provides wireless communication links 910 and wired communication links 908. The wired and wireless communication links can employ any suitable connection technology, such as Bluetooth, 802.11, Ethernet, public switched telephone networks, SONET, etc. In some embodiments, the wagering game server 906 can serve wagering games and distribute content to devices located in other casinos 912 or at other locations on the communications network 914.

The wagering game machines 902 described herein can take any suitable form, such as floor standing models, handheld mobile units, bartop models, workstation-type console models, etc. Further, the wagering game machines 902 can be primarily dedicated for use in conducting wagering games, or can include non-dedicated devices, such as mobile phones, personal digital assistants, personal computers, etc. In one embodiment, the wagering game network 900 can include other network devices, such as accounting servers, wide area progressive servers, player tracking servers, and/or other devices suitable for use in connection with embodiments of the invention.

In some embodiments, wagering game machines 902 and wagering game servers 906 work together such that a wagering game machine 902 can be operated as a thin, thick, or intermediate client. For example, one or more elements of game play may be controlled by the wagering game machine 902 (client) or the wagering game server 906 (server). Game play elements can include executable game code, lookup tables, configuration files, game outcome, audio or visual representations of the game, game assets or the like. In a thin-client example, the wagering game server 906 can perform functions such as determining game outcome or managing assets, while the wagering game machine 902 can present a graphical representation of such outcome or asset modification to the user (e.g., player). In a thick-client example, the wagering game machines 902 can determine game outcomes and communicate the outcomes to the wagering game server 906 for recording or managing a player's account.

In some embodiments, either the wagering game machines 902 (client) or the wagering game server 906 can provide functionality that is not directly related to game play. For example, account transactions and account rules may be managed centrally (e.g., by the wagering game server 906) or locally (e.g., by the wagering game machine 902). Other functionality not directly related to game play may include power management, presentation of advertising, software or firmware updates, system quality or security checks, etc.

Any of the wagering game network components (e.g., the wagering game machines 902) can include hardware and machine-readable media including instructions for performing the operations described herein.

Example Wagering Game Machine

Figure 10:
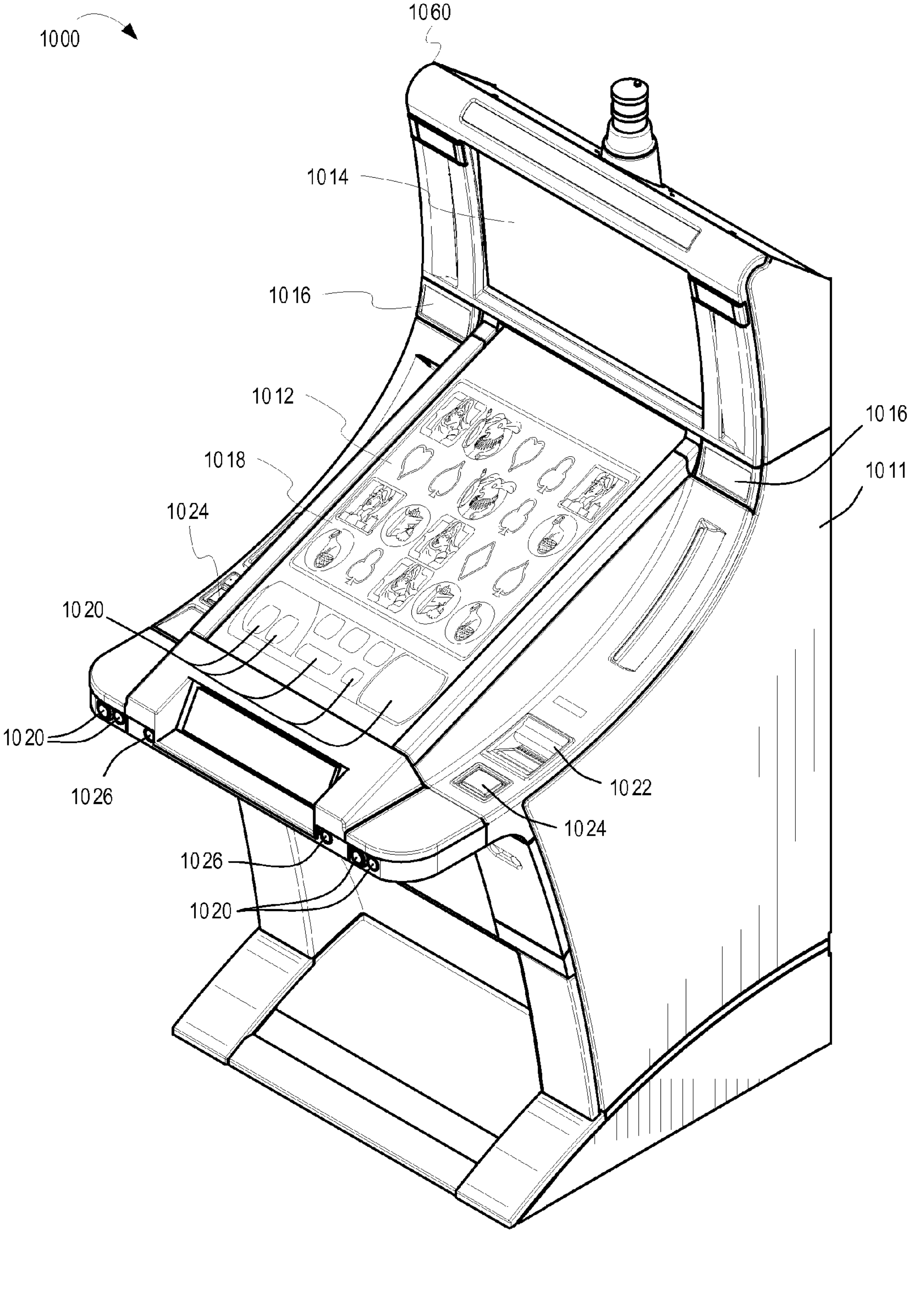
FIG. 10 is a perspective view of a wagering game machine, according to example embodiments of the invention.

FIG. 10 is a conceptual diagram that illustrates an example of a wagering game system 1000, according to some embodiments. In FIG. 10, the wagering game system 1000 includes a wagering game machine 1060 similar to those used in gaming establishments, such as casinos. The wagering game machine 1060 may, in some examples, be referred to as a gaming terminal or an electronic gaming machine. The wagering game machine 1060 may have varying structures and methods of operation. For example, the wagering game machine 1060 may include electromechanical components configured to play mechanical slots. In another example, the 1060 includes electronic components configured to play a video casino game, such as slots, keno, poker, blackjack, roulette, craps, etc. The wagering game machine 1060 is depicted as a floor-standing model. However, other examples of wagering game machines include handheld mobile units, bartop models, workstation-type console models, etc. Further, the wagering game machine 1060 may be primarily dedicated for use in conducting wagering games, or may include non-dedicated devices, such as mobile phones, personal digital assistants, personal computers, etc. Exemplary types of wagering game machines are disclosed in U.S. Pat. No. 6,517,433 and Patent Application Publication Nos. US2010/0062196 and US2010/0234099, which are incorporated herein by reference in their entireties.

The wagering game machine 1060 illustrated in FIG. 10 comprises a cabinet 1011 that may house various input devices, output devices, and input/output devices. By way of example, the wagering game machine 1060 includes a primary display area 1012, a secondary display area 1014, and one or more audio speakers 1016. The primary display area 1012 or the secondary display area 1014 may include one or more of a cathode ray tube (CRT), a high resolution liquid crystal display (LCD), a plasma display, a light emitting diode (LED) display, a three-dimensional (3D) display, a video display, or a combination thereof. In some examples, the primary display area 1012 or the secondary display area 1014 includes mechanical reels to display a wagering game outcome. In some example, the primary display area 1012 or the secondary display area 1014 present a transmissive video display disposed in front of a mechanical-reel display to portray a video image superimposed upon the mechanical-reel display. In FIG. 10, the wagering game machine 1060 is a "slant-top" version in which the primary display 1012 is slanted (e.g., at about a thirty-degree angle toward the player of the wagering game machine 1060). Another example of wagering game machine 1060 is an "upright" version in which the primary display 1014 is oriented vertically relative to the player. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the wagering game machine 1060. The wagering game machine 1060 includes a touch screen(s) 1018 mounted over the primary or secondary areas, buttons 1020 on a button panel, bill validator 1022, information reader/writer(s) 1024, and player-accessible port(s) 1026 (e.g., audio output jack for headphones, video headset jack, USB port, wireless transmitter/receiver, etc.). It should be understood that numerous other peripheral devices and other elements exist and are readily utilizable in any number of combinations to create various forms of a wagering game machine in accord with the present concepts.

Input devices, such as the touch screen 1018, buttons 1020, a mouse, a joystick, a gesture-sensing device, a voice-recognition device, and a virtual input device, accept player input (s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product that may include a machine-readable storage medium having stored thereon instructions, which may be used to program a computer system to perform a process according to embodiments(s), whether presently described or not, because every conceivable variation is not enumerated herein. A machine-readable storage medium includes any mechanism that stores information in a form readable by a machine (e.g., a wagering game machine, computer, etc.). For example, machine-readable storage media includes read only memory (ROM), random access memory (RAM), magnetic disk storage media, optical storage media (e.g., CD-ROM), flash memory machines, erasable programmable memory (e.g., EPROM and EEPROM); etc. Some embodiments of the invention can also include machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:

receiving, into a non-transitory machine-readable storage medium, a plurality of data items for display on a display device of a wagering game machine, the data items associated with previous win amounts awarded to players of wagering games on client devices other than a client device of a current player of a wagering game, wherein the client devices are communicably coupled via a network to a server that stores the data items;

associating, by one or more processors, a first previous win amount of the previous win amounts to a first subset of one or more game symbols for the wagering game;

displaying the first previous win amount in proximity to the one or more game symbols on the display device;

determining, by the one or more processors, a first probability of winning the first previous win amount;

associating, by the one or more processors, a second previous win amount of the previous win amounts to a second subset of the one or more game symbols for the wagering game;

determining, by the one or more processors, a second probability of winning the second previous win amount, wherein the first probability and the second probability are determined independently of one another; and in response to determining, by at least one of the one or more processors based on an output of a random element generator, that at least one previous win amount of the previous win amounts is to be awarded during the wagering game, crediting the previous win amount and indicating on the display device the at least one previous win amount that is to be awarded.

2. The method of claim 1, wherein the one or more game symbols comprise a reel of a slots game and wherein the previous win amount is displayed in proximity to the reel.

3. The method of claim 1, wherein a game symbol of the one or more game symbols comprises a playing card symbol and wherein the previous win amount is displayed in proximity to the playing card symbol.

4. The method of claim 1, wherein a probability of winning the previous win amount is determined in accordance with a magnitude of the previous win amount.

5. The method of claim 4, further comprising highlighting the one or more game symbols associated with the previous win amount in accordance with the probability of winning the previous win amount.

6. The method of claim 1, wherein the previous win amount is associated with a first player, and further comprising:

in response to determining that the previous win amount has been won by a second player, providing an award to the first player.

7. The method of claim 6, wherein the award comprises at least a portion of the previous win amount.

8. The method of claim 1, further comprising changing associations of previous win amounts associated with the one or more game symbols in response to a trigger event.

9. The method of claim 8, wherein the trigger event includes at least one of an expiration of time, a new round of wagering game play, a predetermined number of rounds of wagering game play, or a jackpot win.

10. The method of claim 1, and further comprising filtering a domain of data including the previous win amounts according to a threshold value for the previous win amounts.

11. The method of claim 1, and further comprising assigning the previous win amounts to one of a plurality of groups, and wherein associating, by one or more processors, the previous win amounts to one or more game symbols for the wagering game includes selecting previous win amounts from one or more of the plurality of groups.

12. The method of claim 1, wherein determining, by at least one of the one or more processors, that the previous win amount is to be awarded includes determining that a current outcome for a current player matches a previous outcome for a player other than the current player that resulted in the previous win amount.

13. A non-transitory machine-readable storage medium having stored thereon machine executable instructions for causing one or more processors to perform operations comprising:

receiving a plurality data items for display on a display device, the data items associated with previous win amounts awarded to players of wagering games on client devices other than a client device of a current player of a wagering game, wherein the client devices are communicably coupled via a network;

associating a first previous win amount of the previous win amounts to a first subset of one or more game symbols for the wagering game;

displaying the first previous win amount in proximity to the one or more game symbols on the display device;

determining a first probability of winning the first previous win amount;

associating a second previous win amount of the previous win amounts to a second subset of the one or more game symbols for the wagering game;

determining a second probability of winning the second previous win amount, wherein the first probability and the second probability are determined independently of one another; and in response to determining, based on an output of a random element generator, that at least one previous win amount of the previous win amounts is to be awarded during the wagering game, crediting the previous win amount and indicating on the display device the at least one previous win amount that is to be awarded.

14. The machine-readable storage medium of claim 13, wherein the one or more game symbols include a reel of a slots game, a playing card, a bingo ball, a bingo space, or a roulette space and wherein the previous win amount is displayed in proximity to the one or more game symbols.

15. The machine-readable storage medium of claim 13, wherein the first probability is determined in accordance with a magnitude of the first previous win amount and wherein the second probability is determined in accordance with a magnitude of the second previous win amount.

16. The machine-readable storage medium of claim 15, wherein the operations further comprise highlighting the one or more game symbols associated with the previous win amount in accordance with the probability of winning the previous win amount.

17. The machine-readable storage medium of claim 13, wherein the previous win amount is associated with a first player, and wherein the operations further comprise:

in response to determining that the previous win amount has been won by a second player, providing an award to the first player.

18. The machine-readable storage medium of claim 17, wherein the award comprises at least a portion of the previous win amount.

19. The machine-readable storage medium of claim 13, further comprising changing associations of previous win amounts associated with the one or more game symbols in response to a trigger event.

20. The machine-readable storage medium of claim 19, wherein the trigger event includes at least one of an expiration of time, a new round of wagering game play, a predetermined number of rounds of wagering game play, or a jackpot win.

21. A system comprising:

at least one processor;

a random element generator; and at least one memory device storing instructions, that when executed by the at least one processor, cause the system to:

receive a plurality of data items for display on a display device, the data items associated with previous win amounts awarded to players of wagering games on client devices other than a client device of a current player of a wagering game, wherein the client devices are communicably coupled via a network to a server that stores the data items;

associate a first previous win amount of the previous win amounts to a first subset of one or more game symbols for the wagering game;

display the first previous win amount in proximity to the one or more game symbols on the display device;

determine a first probability of winning the first previous win amount;

associate a second previous win amount of the previous win amounts to a second subset of the one or more game symbols for the wagering game;

determine a second probability of winning the second previous win amount, wherein the first probability and the second probability are determined independently of one another; and in response to a determination, based at least in part on an output of the random element generator, that at least one previous win amount of the previous win amounts is to be awarded during the wagering game, credit the previous win amount and indicate on the display device the at least one previous win amount that is to be awarded.

22. The system of claim 21, wherein the one or more game symbols include a reel of a slots game, a playing card, a bingo ball, a bingo space, or a roulette space and wherein the previous win amount is displayed in proximity to the one or more game symbols.

23. The system of claim 21, wherein a probability of winning the previous win amount is determined in accordance with a magnitude of the previous win amount.

24. The system of claim 23, wherein the instructions, when executed by the at least one processor, cause the system to highlight the one or more game symbols associated with the previous win amount in accordance with the probability of winning the previous win amount.

25. The system of claim 21, wherein the previous win amount is associated with a first player, and wherein the instructions, when executed by the at least one processor, cause the system to:

in response to a determination that the previous win amount has been won by a second player, provide an award to the first player.

26. The system of claim 21, wherein the instructions, when executed by the at least one processor, cause the system to:

receive a token associated with the previous win amount; and validate the previous win amount using the token.

27. The system of claim 26, wherein the instructions, when executed by the at least one processor, cause the system to:

receive a selection of a previous win amount presented on the display device; and display on the display device a previous outcome resulting in the previous win amount using the token.

* * * * *